United States Patent
Li et al.

(10) Patent No.: US 11,883,866 B1
(45) Date of Patent: Jan. 30, 2024

(54) ENERGY-SAVING IN-SITU STEAM THERMAL DESORPTION PROCESS FOR REMEDIATING PESTICIDE CONTAMINATED SITES

(71) Applicant: Nanjing Institute of Environmental Sciences, MEE, Nanjing (CN)

(72) Inventors: Mei Li, Nanjing (CN); Shengtian Zhang, Nanjing (CN); Liming Han, Nanjing (CN); Lu Yang, Nanjing (CN); Jinzhong Wan, Nanjing (CN); Qun Li, Nanjing (CN); Yan Zhou, Nanjing (CN); Tingting Fan, Nanjing (CN); Decheng Jin, Nanjing (CN); Yuanchao Zhao, Nanjing (CN); Xiang Wang, Nanjing (CN)

(73) Assignee: Nanjing Institute of Environmental Sciences, MEE, Nanjing (CN)

( * ) Notice: Subject to any disclaimer, the term of this patent is extended or adjusted under 35 U.S.C. 154(b) by 0 days.

(21) Appl. No.: 18/296,368

(22) Filed: Apr. 5, 2023

(30) Foreign Application Priority Data

Jul. 12, 2022 (CN) .......................... 202210818564.0

(51) Int. Cl.
  *B09C 1/10* (2006.01)
  *B09C 1/06* (2006.01)
  *B09C 1/00* (2006.01)
  *B09C 1/08* (2006.01)

(52) U.S. Cl.
  CPC .................. *B09C 1/10* (2013.01); *B09C 1/06* (2013.01); *B09C 1/00* (2013.01); *B09C 1/002* (2013.01); *B09C 1/08* (2013.01); *B09C 2101/00* (2013.01)

(58) Field of Classification Search
  CPC .... B09C 1/10; B09C 1/06; B09C 1/00; B09C 1/002; B09C 1/08; B09C 2101/00
  See application file for complete search history.

(56) References Cited

U.S. PATENT DOCUMENTS 5,829,918 A * 11/1998 Chintis ................. E21B 43/295
                                                              405/128.3
2009/0180836 A1 * 7/2009 Gerhard et al. .......... B09C 1/06
                                                              405/128.85

FOREIGN PATENT DOCUMENTS

| CN | 102775080 B | 11/2013 |
| CN | 105689379 B | 9/2018 |
| CN | 106216382 B | 7/2019 |

(Continued)

OTHER PUBLICATIONS

Search Report, issued in CN202210818564.0 (priority application), by CNIPA, dated Jul. 12, 2022.

(Continued)

*Primary Examiner* — Tara Mayo
(74) *Attorney, Agent, or Firm* — Zhu Lehnhoff LLP

(57) ABSTRACT

An in-situ steam thermal desorption process for remediating pesticide contaminated sites comprises S1, determining a contaminated layer; S2, primary steam injection; S3, secondary steam injection and regulator injection; wherein the regulator comprises the following components in parts by weight: 0.2-0.8 parts by weight of hyper-thermophilic microbial agent, 0.5-0.9 parts by weight of carbamyl phosphate, 2-3 parts by weight of cyclic 2,3-diphosphoglycerate, 3-4 parts by weight of ethylenediamine tetraacetic acid, 15-17 parts by weight of wort, and 5-6 parts by weight of sodium octadecyl sulfate; S4, tertiary steam injection; S5, conservation.

9 Claims, 2 Drawing Sheets

(56) References Cited

FOREIGN PATENT DOCUMENTS

| | | |
|---|---|---|
| CN | 110665952 A | 1/2020 |
| CN | 111299314 A | 6/2020 |

OTHER PUBLICATIONS

Notification to Grant Patent Right for Invention, issued in CN202210818564.0 (priority application), by CNIPA, dated Mar. 12, 2023.

* cited by examiner

ENERGY-SAVING IN-SITU STEAM THERMAL DESORPTION PROCESS FOR REMEDIATING PESTICIDE CONTAMINATED SITES

REFERENCE TO RELATED APPLICATIONS

The present application claims the priority of Chinese patent application No. 202210818564.0 filed on 2022 Jul. 12, the entire disclose of which is incorporated herein by reference.

TECHNICAL FIELD

The present disclosure relates to the technical field of pesticide contaminated soil treatment, in particular to an energy-saving in-situ steam thermal desorption process for remediating pesticide contaminated sites.

BACKGROUND OF THE INVENTION

China is a big producer of pesticide. According to the statistical data of pesticide production in the decade from 2007 to 2016, pesticide production in China accounts for about ⅓ of the total pesticide production in the world. With the development of economy and society in China, the advancement of industrialization and urbanization, and the transformation and upgrading of pesticide production enterprises, the number of contaminated sites after the original pesticide production enterprises are shut down for relocation has increased year by year. Up to now, there are nearly 500 known pesticide production sites in the Yangtze River Delta area alone. Waste residue/water produced in the pesticide production process may result in site contamination due to poor management.

Pesticide chemical sites mainly involve organic contaminants, which are volatile and degradation-resistant. Most pesticide contamination is distributed in cohesive soil, and it is difficult to remediate the sites due to the strong adsorption of organic contaminants in cohesive soil. Moreover, the problem of odor in pesticide contaminated sites is prominent. In the case of ex-situ remediation, the problem of odor disturbing people resulted from large-scale excavation has become one of the difficult problems in the remediating pesticide contaminated sites. Therefore, in-situ thermal desorption technology is an effective means to repair and treat pesticide contaminated soil. However, in-situ thermal desorption has the disadvantages of high energy consumption and high cost. An energy-saving and environmental-friendly method for remediating pesticide chemical contaminated soil with low energy consumption and high contaminant removal rate is urgently needed.

SUMMARY OF THE INVENTION

Aiming at the above problems, the present disclosure provides a method for remediating pesticide chemical contaminated sites based on energy-saving thermal desorption technology.

The technical scheme of the present disclosure is as follows.

A method for remediating pesticide chemical contaminated sites based on energy-saving thermal desorption technology is provided, comprising the following steps:

S1, determining a contaminated layer: in which the main contaminants in pesticide chemical contaminated sites are measured, it is determined that a remediation layer is the earth surface to the soil within the depth range of 60 cm to 20 m below the ground, and hydrated lime are mixed on the surface of the remediation layer;

S2, primary steam injection: in which a plurality of rows of primary steam injection wells arranged at equal intervals are provided on the soil surface, six groups of steam collection wells are provided around each primary steam injection well using a diamond-shaped seven-point method, a concrete floor is paved on the soil surface, high-temperature steam of 320-360° C. is injected into the remediation layer through the primary steam injection wells, the steam injection time stops for 2 h every 8 h, the steam injection speed of each steam injection well is 0.52-0.68 m$^3$ equivalent water/h, three steam injection cycles are set in total, and the backflow steam containing contaminants is recovered through the steam collection well;

S3, secondary steam injection and regulator injection: in which after the primary steam injection, six groups of steam collection wells are used as six groups of regulator injection wells, regulators are injected through the regulator injection wells, the regulator injection speed of each regulator injection well is 800-1200 ml/h, the regulator injection time is 8-10 h, the primary steam injection well is then converted into a secondary steam injection well for secondary steam injection, the secondary steam injection speed of each secondary steam injection well is controlled to be 0.15-0.35 m$^3$ equivalent water/h, the steam temperature is 160-180° C., the steam injection time is 16-20 h, standing for 48 h after the steam injection, and the backflow steam containing contaminants is collected and recovered through the regulator injection well;

the regulator comprises the following components in parts by weight: 0.2-0.8 parts by weight of hyper-thermophilic microbial agent, 0.5-0.9 parts by weight of carbamyl phosphate, 2-3 parts by weight of cyclic 2,3-diphosphoglycerate, 3-4 parts by weight of ethylenediamine tetraacetic acid, 15-17 parts by weight of wort, and 5-6 parts by weight of sodium octadecyl sulfate;

S4, tertiary steam injection: in which after the standing time, all points formed by the primary steam injection wells and the regulator injection wells are re-divided by a positive nine-point method, the center point of every nine groups of points is a new tertiary steam injection well, nine groups of wells around each group of tertiary steam injection wells are empty wells, high-temperature steam of 380-400° C. is injected into the tertiary steam injection wells, the steam injection speed of each steam injection well is 0.35-0.4 m$^3$ equivalent water/h, the steam injection time is 10 h, and the wells other than the tertiary steam injection wells are used as steam collection wells to recover the backflow steam containing contaminants;

S5, conservation: in which on the 10th to 12th day after the tertiary steam injection, the concrete floor is removed, and plants are planted in the remediated pesticide chemical contaminated sites.

Further, the main contaminants of pesticide chemical contaminated sites in step S1 are saturated hydrocarbons and PAHs. The remediation method of the present disclosure is mainly aimed at saturated hydrocarbons and PAHs in soil.

Further, a primary injection point of primary steam injection in step S2 and a secondary injection point of secondary steam injection in step S3 are both located at 60-90% of the depth of the remediation layer below the ground, the distance between two adjacent primary steam injection wells in each row is 5-30 m, and the thickness of the concrete floor is 10-15 cm. The injected steam can fully diffuse in the soil, and the concrete floor can prevent contaminants from escaping into the ambient air after being evaporated.

Still further, the steam outlet directions of the primary injection point of primary steam injection in step S2 and the secondary injection point of secondary steam injection in step S3 are both 45 degrees south by west or 45 degrees south by east. The steam outlet direction can be adjusted according to the source direction of nearby rivers, which greatly improves the diffusion efficiency of injected steam, and can form a good cooperation with the injection of regulators to avoid steam waste, thus achieving the purpose of saving energy.

Further, in step S3, each group of regulator injection wells is provided with three regulator injection points, and the regulator injection points are located at 40%, 60% and 80% of the depth of the remediation layer below the ground, so as to avoid excessive concentration of microorganisms and improve the activity of microorganisms in soil.

Further, in step S3, the hyper-thermophilic microbial agent comprises the following components in parts by weight: 10-12 parts by weight of thermophilic methane bacteria, 8-10 parts by weight of hyper-thermophilic archaea, 2-3 parts by weight of Thermococcus, and 0.5-1 parts by weight of Pyrobaculum. The hyper-thermophilic microorganisms have good adaptability to high-temperature environment, good thermal stability and high-temperature catalytic activity, and the remediation effect on soil can be greatly improved by combining the microorganisms with hot steam. The optimum growth temperature of thermophilic methane bacteria is 82-88° C. The optimum growth temperature of hyper-thermophilic archaea is 80-115° C. The optimum growth temperature of Thermococcus is 96-100° C. The optimum growth temperature of Pyrobaculum is 100° C. In the process of standing after the secondary steam injection, the steam temperature decreases, which basically meets the optimum growth temperature of each component of hyper-thermophilic microbial agent.

Further, the mixing depth of hydrated lime in step S1 is 10-20 cm below the ground, and the mixing amount of hydrated lime is 15-20 kg/m$^2$ of soil. The steam thermal desorption enhanced by hydrated lime can reduce the soil viscosity, enhance the dispersibility, reduce the particle size, and generate a layer of coke-like substances on the surface, thus improving the removal effect of petroleum hydrocarbons.

Further, in step S4, the tertiary injection point of tertiary steam injection is located at 70-75% of the depth of the remediation layer below the ground, and there are three steam outlet directions of the tertiary injection point, that is, due south, 60 degrees north by west and 60 degrees north by east, so that steam injection is more sufficient.

Further, step S1 further comprises ploughing the soil to remove gravel and dead leaves, so as to ensure that impurities in the soil environment to be treated are reduced to avoid affecting the remediation effect.

The present disclosure has the following beneficial effects.

(1) The method for remediating pesticide chemical contaminated sites using the thermal desorption technology according to the present disclosure combines the in-situ steam thermal desorption technology with hyper-thermophilic microorganisms, and divides the steam injection step into three steps at the same time. The first step is to remove part of soil contaminants as pretreatment. The second step is to inject steam matched with the active temperature of hyper-thermophilic microorganisms for advanced treatment. The final step is to take relatively high-temperature steam as head and tail treatment. The hyper-thermophilic microorganisms have good adaptability to high-temperature environment, good thermal stability and high-temperature catalytic activity, and the remediation effect on soil can be greatly improved by combining the microorganisms with hot steam. The optimum growth temperature of thermophilic methane bacteria is 82-88° C. The optimum growth temperature of hyper-thermophilic archaea is 80-115° C. The optimum growth temperature of Thermococcus is 96-100° C. The optimum growth temperature of Pyrobaculum is 100° C. In the process of standing after the secondary steam injection, the steam temperature decreases, which basically meets the optimum growth temperature of each component of hyper-thermophilic microbial agent.

(2) The method for remediating pesticide chemical contaminated sites using the thermal desorption technology according to the present disclosure successively uses two steam injection methods, that is, a diamond-shaped seven-point method and a positive nine-point method. The interaction between hot steam and hyper-thermophilic microorganisms can be better promoted by adjusting the steam injection direction of the injection point, thus reducing the steam injection amount, greatly improving the steam treatment effect, and achieving the purpose of saving energy.

(3) The hyper-thermophilic microorganisms selected in the method for remediating pesticide chemical contaminated sites using the thermal desorption technology according to the present disclosure can maintain their normal metabolic activities under high-temperature conditions by rapidly synthesizing or replacing metabolites with poor thermal stability, improving the catalytic efficiency of enzyme molecules and some special protection mechanisms, and can exert normal physiological functions at high temperature, improve the catalytic efficiency and overcome the limitation of microbial application under high-temperature conditions.

(4) In the method for remediating pesticide chemical contaminated sites using the thermal desorption technology according to the present disclosure, the steam thermal desorption enhanced by hydrated lime can reduce the soil viscosity, enhance the dispersibility, reduce the particle size, and generate a layer of coke-like substances on the surface, thus improving the removal effect of petroleum hydrocarbons. The concrete floor can prevent contaminants from escaping into the ambient air after being evaporated.

DETAILED DESCRIPTION OF THE INVENTION

Embodiment 1

Figure 1:
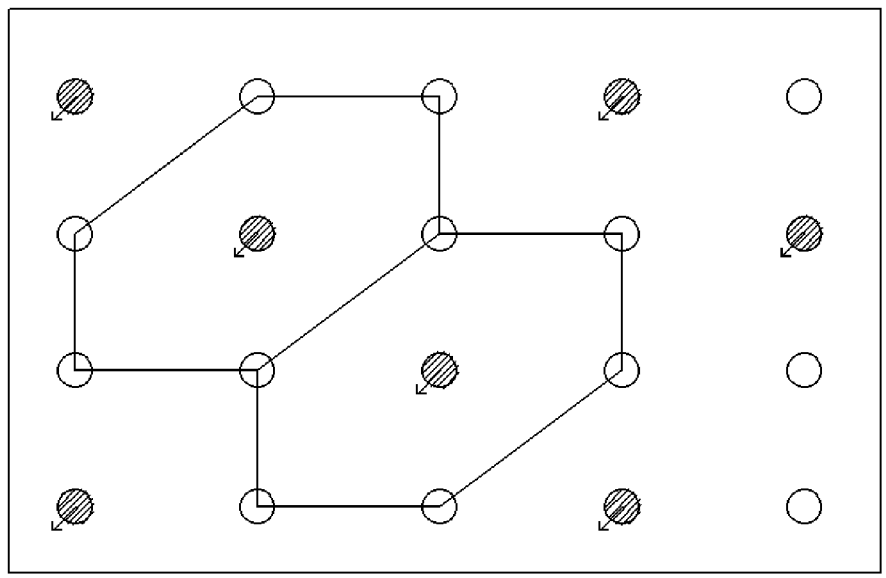
FIG. 1 is a well site deployment diagram during primary steam injection according to present disclosure.
Figure 2:
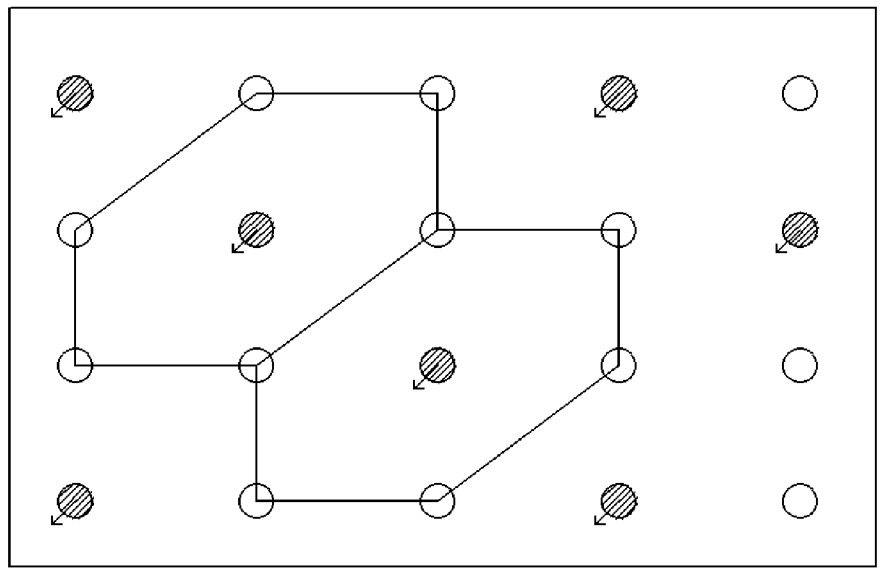
FIG. 2 is a well site deployment diagram during secondary steam injection and regulator injection according to the present disclosure.

A method for remediating pesticide chemical contaminated sites based on energy-saving thermal desorption technology comprises the following steps:

S1, determining a contaminated layer: in which the main contaminants in pesticide chemical contaminated sites are measured, it is determined that a remediation layer is the earth surface to the soil within the depth range of 15 m below the ground, hydrated lime are mixed on the surface of the remediation layer, the mixing depth of hydrated lime is 15 cm below the ground, the mixing amount of hydrated lime is 18 kg/m$^2$ of soil, the soil is ploughed to remove gravel and dead leaves, and the main contaminants of pesticide chemical contaminated sites are saturated hydrocarbons;

S2, primary steam injection: in which as shown in FIG. 1, three rows of seven primary steam injection wells arranged at equal intervals are provided on the soil surface, the distance between two adjacent primary steam injection wells in each row is 18 m, six groups of steam collection wells are provided around each primary steam injection well using a diamond-shaped seven-point method, a concrete floor with a thickness of 12 cm is paved on the soil surface, high-temperature steam of 340° C. is injected into the remediation layer through the primary steam injection wells, the steam injection time stops for 2 h every 8 h, the steam injection speed of each steam injection well is 0.64 m$^3$ equivalent water/h, three steam injection cycles are set in total, the backflow steam containing contaminants is recovered through the steam collection well, the primary injection point of the primary steam injection is at 80% of the depth of the remediation layer below the ground, and the steam outlet direction of the primary injection point is 45 degrees south by west;

S3, secondary steam injection and regulator injection: in which as shown in FIG. 2, after the primary steam injection, six groups of steam collection wells are used as six groups of regulator injection wells, regulators are injected through the regulator injection wells, the regulator injection speed of each regulator injection well is 1000 ml/h, the regulator injection time is 9 h, the primary steam injection well is then converted into a secondary steam injection well for secondary steam injection, the secondary steam injection speed of each secondary steam injection well is controlled to be 0.25 m$^3$ equivalent water/h, the steam temperature is 170° C., the steam injection time is 18 h, standing for 48 h after the steam injection, the backflow steam containing contaminants is collected and recovered through the regulator injection well, the secondary injection point of the secondary steam injection is at 80% of the depth of the remediation layer below the ground, the steam outlet direction of the secondary injection point is 45 degrees south by west, each group of regulator injection wells is provided with three regulator injection points, and the regulator injection points are located at 40%, 60% and 80% of the depth of the remediation layer below the ground;

the regulator comprises the following components in parts by weight: 0.6 parts by weight of hyper-thermophilic microbial agent, 0.7 parts by weight of carbamyl phosphate, 2 parts by weight of cyclic 2,3-diphosphoglycerate, 3 parts by weight of ethylenediamine tetraacetic acid, 17 parts by weight of wort, and 6 parts by weight of sodium octadecyl sulfate;

the hyper-thermophilic microbial agent comprises the following components in parts by weight: 11 parts by weight of thermophilic methane bacteria, 9 parts by weight of hyper-thermophilic archaea, 2 parts by weight of Thermococcus, and 1 part by weight of Pyrobaculum.

Figure 3:
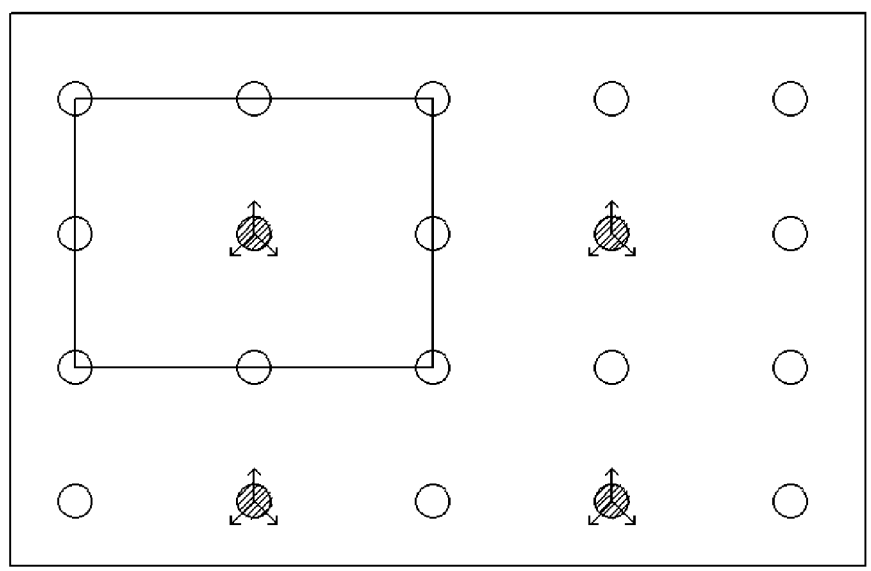
FIG. 3 is a well site deployment diagram of tertiary steam injection according to the present disclosure.

S4, tertiary steam injection: in which as shown in FIG. 3, after the standing time, all points formed by the primary steam injection wells and the regulator injection wells are re-divided by a positive nine-point method, the center point of every nine groups of points is a new tertiary steam injection well, nine groups of wells around each group of tertiary steam injection wells are empty wells, high-temperature steam of 390° C. is injected into the tertiary steam injection wells, the steam injection speed of each steam injection well is 0.37 m$^3$ equivalent water/h, the steam injection time is 10 h, the wells other than the tertiary steam injection wells are used as steam collection wells to recover the backflow steam containing contaminants, the tertiary injection point of tertiary steam injection is located at 72% of the depth of the remediation layer below the ground, and there are three steam outlet directions of the tertiary injection point, that is, due south, 60 degrees north by west and 60 degrees north by east;

S5, conservation: in which on the 11th day after the tertiary steam injection, the concrete floor is removed, and plants are planted in the remediated pesticide chemical contaminated sites.

Embodiment 2

This embodiment is different from Embodiment 1 in that the depth of the layer and the type of contaminants determined in step S1 are different.

S1, determining a contaminated layer: the main contaminants in pesticide chemical contaminated sites are measured, it is determined that a remediation layer is the earth surface to the soil within the depth range of 60 m below the ground, hydrated lime are mixed on the surface of the remediation layer, the mixing depth of hydrated lime is 10 cm below the ground, the mixing amount of hydrated lime is 15 kg/m$^2$ of soil, the soil is ploughed to remove gravel and dead leaves, and the main contaminants of pesticide chemical contaminated sites are PAHs.

Embodiment 3

This embodiment is different from Embodiment 1 in that the depth of the layer and the type of contaminants determined in step S1 are different.

S1, determining a contaminated layer: the main contaminants in pesticide chemical contaminated sites are measured, it is determined that a remediation layer is the earth surface to the soil within the depth range of 20 m below the ground, hydrated lime are mixed on the surface of the remediation layer, the mixing depth of hydrated lime is 20 cm below the ground, the mixing amount of hydrated lime is 20 kg/m$^2$ of soil, the soil is ploughed to remove gravel and dead leaves, and the main contaminants of pesticide chemical contaminated sites are PAHs.

Embodiment 4

This embodiment is different from Embodiment 1 in that the injection parameters of primary steam injection in step S2 are different.

S2, primary steam injection: 20 primary steam injection wells arranged in a matrix are provided on the soil surface, the distance between two adjacent primary steam injection wells in each row is 5 m, six groups of steam collection wells are provided around each primary steam injection well using a diamond-shaped seven-point method, a concrete floor with a thickness of 10 cm is paved on the soil surface, high-temperature steam of 320° C. is injected into the remediation layer through the primary steam injection wells, the steam injection time stops for 2 h every 8 h, the steam injection speed of each steam injection well is 0.52 m$^3$ equivalent water/h, three steam injection cycles are set in total, the backflow steam containing contaminants is recovered through the steam collection well, the primary injection point of the primary steam injection is at 60% of the depth of the remediation layer below the ground, and the steam outlet direction of the primary injection point is 45 degrees south by west.

Embodiment 5

This embodiment is different from Embodiment 1 in that the injection parameters of primary steam injection in step S2 are different.

S2, primary steam injection: 20 primary steam injection wells arranged in a matrix are provided on the soil surface, the distance between two adjacent primary steam injection wells in each row is 30 m, six groups of steam collection wells are provided around each primary steam injection well using a diamond-shaped seven-point method, a concrete floor with a thickness of 15 cm is paved on the soil surface, high-temperature steam of 360° C. is injected into the remediation layer through the primary steam injection wells, the steam injection time stops for 2 h every 8 h, the steam injection speed of each steam injection well is 0.68 m$^3$ equivalent water/h, three steam injection cycles are set in total, the backflow steam containing contaminants is recovered through the steam collection well, the primary injection point of the primary steam injection is at 90% of the depth of the remediation layer below the ground, and the steam outlet direction of the primary injection point is 45 degrees south by east.

Embodiment 6

This embodiment is different from Embodiment 1 in that the injection parameters of regulator injection in step S3 are different.

S3, secondary steam injection and regulator injection: after the primary steam injection, six groups of steam collection wells are used as six groups of regulator injection wells, regulators are injected through the regulator injection wells, the regulator injection speed of each regulator injection well is 800 ml/h, the regulator injection time is 8 h, the primary steam injection well is then converted into a secondary steam injection well for secondary steam injection, the secondary steam injection speed of each secondary steam injection well is controlled to be 0.15 m$^3$ equivalent water/h, the steam temperature is 160° C., the steam injection time is 16 h, standing for 48 h after the steam injection, the backflow steam containing contaminants is collected and recovered through the regulator injection well, the secondary injection point of the secondary steam injection is at 60% of the depth of the remediation layer below the ground, the steam outlet direction of the secondary injection point is 45 degrees south by west, each group of regulator injection wells is provided with three regulator injection points, and the regulator injection points are located at 40%, 60% and 80% of the depth of the remediation layer below the ground.

Embodiment 7

This embodiment is different from Embodiment 1 in that the injection parameters of regulator injection in step S3 are different.

S3, secondary steam injection and regulator injection: after the primary steam injection, six groups of steam collection wells are used as six groups of regulator injection wells, regulators are injected through the regulator injection wells, the regulator injection speed of each regulator injection well is 1200 ml/h, the regulator injection time is 10 h, the primary steam injection well is then converted into a secondary steam injection well for secondary steam injection, the secondary steam injection speed of each secondary steam injection well is controlled to be 0.35 m$^3$ equivalent water/h, the steam temperature is 180° C., the steam injection time is 20 h, standing for 48 h after the steam injection, the backflow steam containing contaminants is collected and recovered through the regulator injection well, the secondary injection point of the secondary steam injection is at 90% of the depth of the remediation layer below the ground, the steam outlet direction of the secondary injection point is 45 degrees south by east, each group of regulator injection wells is provided with three regulator injection points, and the regulator injection points are located at 40%, 60% and 80% of the depth of the remediation layer below the ground.

Embodiment 8

This embodiment is different from Embodiment 1 in that the distribution ratio of the components of the regulator in step S3 is different.

The regulator comprises the following components in parts by weight: 0.2 parts by weight of hyper-thermophilic microbial agent, 0.5 parts by weight of carbamyl phosphate, 3 parts by weight of cyclic 2,3-diphosphoglycerate, 4 parts by weight of ethylenediamine tetraacetic acid, 15 parts by weight of wort, and 5 parts by weight of sodium octadecyl sulfate.

Embodiment 9

This embodiment is different from Embodiment 1 in that the distribution ratio of the components of the regulator in step S3 is different.

The regulator comprises the following components in parts by weight: 0.8 parts by weight of hyper-thermophilic microbial agent, 0.9 parts by weight of carbamyl phosphate, 3 parts by weight of cyclic 2,3-diphosphoglycerate, 3 parts by weight of ethylenediamine tetraacetic acid, 17 parts by weight of wort, and 5 parts by weight of sodium octadecyl sulfate.

Embodiment 10

This embodiment is different from Embodiment 1 in that the distribution ratio of the components of the hyper-thermophilic microbial agent in step S3 is different.

The hyper-thermophilic microbial agent comprises the following components in parts by weight: 10 parts by weight of thermophilic methane bacteria, 8 parts by weight of hyper-thermophilic archaea, 3 parts by weight of Thermococcus, and 1 part by weight of Pyrobaculum.

Embodiment 11

This embodiment is different from Embodiment 1 in that the distribution ratio of the components of the hyper-thermophilic microbial agent in step S3 is different.

The hyper-thermophilic microbial agent comprises the following components in parts by weight: 12 parts by weight of thermophilic methane bacteria, 10 parts by weight of hyper-thermophilic archaea, 2 parts by weight of Thermococcus, and 0.5 parts by weight of Pyrobaculum.

Embodiment 12

This embodiment is different from Embodiment 1 in that the injection parameters of tertiary steam injection in step S4 are different.

S4, tertiary steam injection: after the standing time, all points formed by the primary steam injection wells and the regulator injection wells are re-divided by a positive nine-point method, the center point of every nine groups of points is a new tertiary steam injection well, nine groups of wells around each group of tertiary steam injection wells are empty wells, high-temperature steam of 380° C. is injected into the tertiary steam injection wells, the steam injection speed of each steam injection well is 0.35 m$^3$ equivalent water/h, the steam injection time is 10 h, the wells other than the tertiary steam injection wells are used as steam collection wells to recover the backflow steam containing contaminants, the tertiary injection point of tertiary steam injection is located at 70% of the depth of the remediation layer below the ground, and there are three steam outlet directions of the tertiary injection point, that is, due south, 60 degrees north by west and 60 degrees north by east.

Embodiment 13

This embodiment is different from Embodiment 1 in that the injection parameters of tertiary steam injection in step S4 are different.

S4, tertiary steam injection: after the standing time, all points formed by the primary steam injection wells and the regulator injection wells are re-divided by a positive nine-point method, the center point of every nine groups of points is a new tertiary steam injection well, nine groups of wells around each group of tertiary steam injection wells are empty wells, high-temperature steam of 400° C. is injected into the tertiary steam injection wells, the steam injection speed of each steam injection well is 0.4 m$^3$ equivalent water/h, the steam injection time is 10 h, the wells other than the tertiary steam injection wells are used as steam collection wells to recover the backflow steam containing contaminants, the tertiary injection point of tertiary steam injection is located at 75% of the depth of the remediation layer below the ground, and there are three steam outlet directions of the tertiary injection point, that is, due south, 60 degrees north by west and 60 degrees north by east.

Embodiment 14

This embodiment is different from Embodiment 1 in that the conservation time in step S5 is different.

S5, conservation: on the 10th day after the tertiary steam injection, the concrete floor is removed, and plants are planted in the remediated pesticide chemical contaminated sites.

Embodiment 15

This embodiment is different from Embodiment 1 in that the conservation time in step S5 is different.

S5, conservation: on the 12th day after the tertiary steam injection, the concrete floor is removed, and plants are planted in the remediated pesticide chemical contaminated sites.

Experimental Example 1

The method parameters in Embodiment 1 are applied to the pesticide chemical contaminated sites, in which the main contaminants are saturated hydrocarbons. Comparative Example 1 of a conventional steam injection method is applied to the same contaminated site. The temperature of conventional steam injection is 360° C., the time is 48 h, and the injection amount is 0.5 m$^3$ equivalent water/h. Two groups of experimental data are compared. The comparison results are shown in Table 1.

TABLE 1 the removal rate of the saturated hydrocarbons of the contaminated sites in Embodiment 1 and Comparative Example 1

| | Removal rate | | |
|---|---|---|---|
| | 24 h | 48 h | 3 d |
| Embodiment 1 | 35.6% | 70.1% | 88.4% |
| Comparative Example 1 | 40.2% | 73.9% | 77.8% |

As can be seen from the data in the above table, compared with Comparative Example 1, the method parameters of Embodiment 1 of the present disclosure have improved the removal rate of saturated hydrocarbons in the contaminated site, but the removal rate of Comparative Example 1 is higher than that of Embodiment 1 in the first half of treatment for 24-48 hours, because the role of hyper-thermophilic microorganisms in the soil in Embodiment 1 is not complete in 24-48 hours, and the removal rate of saturated hydrocarbons measured after three days (that is, after tertiary steam injection) is the highest, reaching 88.4%, indicating that the method for remediating pesticide chemical contaminated sites using the energy-saving thermal desorption technology according to the present disclosure has improved the removal effect of saturated hydrocarbons in the soil.

Experimental Example 2

The method parameters in Embodiments 2 and 3 are applied to the pesticide chemical contaminated sites, in which the main contaminants are PAHs. Comparative Example 2 of a conventional steam injection method is applied to the same contaminated site. The temperature of conventional steam injection is 360° C., the time is 48 h, and the injection amount is 0.5 m$^3$ equivalent water/h. Three groups of experimental data are compared. The comparison results are shown in Table 2.

TABLE 2 the removal rate of PAHs of the contaminated sites in Embodiments 2 and 3 and Comparative Example 2

| | Removal rate | | |
|---|---|---|---|
| | 24 h | 48 h | 3 d |
| Embodiment 2 | 38.7% | 74.6% | 92.4% |
| Embodiment 3 | 39.6% | 75.1% | 92.9% |
| Comparative example 2 | 42.5% | 81.2% | 82.5% |

As can be seen from the data in the above table, compared with Comparative Example 2, the method parameters of Embodiments 2 and 3 have improved the removal rate of PAHs in the contaminated site. The removal effect of Comparative Example 2 is better in the first 48 hours, because the injection amount of hot steam is large, but after the injection process of Embodiments 2 and 3 is completed within 3 days, the removal rate can be higher.

Experimental Example 3

The method parameters in Embodiments 1, 8 and 9 are applied to the pesticide chemical contaminated sites, and three groups of experimental data are compared to observe the removal rate of contaminants in soil by different regulator components. The measuring time nodes are after primary steam injection, regulator injection and tertiary steam injection. The comparison results are shown in Table 3.

TABLE 3 the removal rate of saturated hydrocarbons of the contaminated sites in Embodiments 1, 8 and 9

| | Removal rate | | |
|---|---|---|---|
| | After primary steam injection | After regulator injection | After tertiary steam injection |
| Embodiment 1 | 35.9% | 73.2% | 88.1% |
| Embodiment 8 | 34.8% | 71.6% | 86.4% |
| Comparative example 9 | 35.2% | 74.7% | 87.2% |

It can be seen from the data in the above table that the removal rate of PAHs of the distribution ratio of the components of the regulator in Embodiment 1 is the highest after tertiary steam injection, but in Embodiment 9, more parts by weight of hyper-thermophilic microbial agent are used so that the removal rate is the highest after the regulator injection. However, since the addition of less soluble solute has a negative impact on the subsequent total removal rate, the distribution ratio of the components of the regulator in Embodiment 1 is the optimal.

In addition, the range of the method parameters in Embodiments 4-7 and 10-15 is a conventional adjustment range, which has little influence on the removal rate of contaminants in contaminated sites. The method parameters in Embodiments 4-7 and 10-15 of the present disclosure can achieve the removal effect similar to that in Embodiment 1.

The invention claimed is:

1. A in-situ steam thermal desorption process for remediating pesticide contaminated sites, comprising the following steps:
   S1, determining a contaminated layer, including measuring the main contaminants in pesticide chemical contaminated sites, determining that a remediation layer is the soil surface to the soil within the depth range of 60 cm to 20 m below the ground, and mixing hydrated lime on the surface of the remediation layer;
   S2, injecting a primary steam, including providing a plurality of rows of primary steam injection wells arranged at equal intervals on the soil surface, providing six groups of steam collection wells around each primary steam injection well using a diamond-shaped seven-point method, paving a concrete floor on the soil surface, injecting high-temperature steam of 320-360° C. into the remediation layer through the primary steam injection wells, stopping the steam injection time for 2 h every 8 h, wherein the steam injection speed of each steam injection well is 0.52-0.68 m³ equivalent water/h, setting three steam injection cycles in total, and recovering the backflow steam containing contaminants through the steam collection well;
   S3, conducting a secondary steam injection and a regulator injection, including, after the primary steam injection, using six groups of steam collection wells as six groups of regulator injection wells, injecting regulators through the regulator injection wells, wherein the regulator injection speed of each regulator injection well is 800-1200 ml/h, and the regulator injection time is 8-10 h, then converting the primary steam injection well into a secondary steam injection well for secondary steam injection, controlling the secondary steam injection speed of each secondary steam injection well to be 0.15-0.35 m³ equivalent water/h, wherein the steam temperature is 160-180° C., the steam injection time is 16-20 h, standing for 48 h after the steam injection, and collecting and recovering the backflow steam containing contaminants through the regulator injection well; wherein the regulator comprises the following components in parts by weight: 0.2-0.8 parts by weight of hyper-thermophilic microbial agent, 0.5-0.9 parts by weight of carbamyl phosphate, 2-3 parts by weight of cyclic 2,3-diphosphoglycerate, 3-4 parts by weight of ethylenediamine tetraacetic acid, 15-17 parts by weight of wort, and 5-6 parts by weight of sodium octadecyl sulfate;
   S4, conducting a tertiary steam injection, including, after the standing time, forming all points using the primary steam injection wells and re-dividing the regulator injection wells using a positive nine-point method, wherein the center point of every nine groups of points is a new tertiary steam injection well, and wherein nine groups of wells around each group of tertiary steam injection wells are empty wells, injecting high-temperature steam of 380-400° C. into the tertiary steam injection wells, wherein the steam injection speed of each steam injection well is 0.35-0.4 m³ equivalent water/h, the steam injection time is 10 h, and wherein the wells other than the tertiary steam injection wells are used as steam collection wells to recover the backflow steam containing contaminants;
   S5, conducting conservation, including, on the 10th to 12th day after the tertiary steam injection, removing the concrete floor, and planting plants in the remediated pesticide chemical contaminated sites.

2. The in-situ steam thermal desorption process for remediating pesticide contaminated sites according to claim 1, further comprising saturating the main contaminants of pesticide chemical contaminated sites in step S1 with hydrocarbons and PAHs.

3. The in-situ steam thermal desorption process for remediating pesticide contaminated sites according to claim 1, wherein a primary injection point of primary steam injection in step S2 and a secondary injection point of secondary steam injection in step S3 are both located at 60-90% of the depth of the remediation layer below the ground, the distance between two adjacent primary steam injection wells in each row is 5-30 m, and the thickness of the concrete floor is 10-15 cm.

4. The in-situ steam thermal desorption process for remediating pesticide contaminated sites according to claim 3, wherein the steam outlet directions of the primary injection point of primary steam injection in step S2 and the secondary injection point of secondary steam injection in step S3 are both 45 degrees south by west or 45 degrees south by east.

5. The in-situ steam thermal desorption process for remediating pesticide contaminated sites according to claim 1, wherein in step S3, each group of regulator injection wells is provided with three regulator injection points, and the regulator injection points are located at 40%, 60% and 80% of the depth of the remediation layer below the ground.

6. The in-situ steam thermal desorption process for remediating pesticide contaminated sites according to claim 1, wherein in step S3, the hyper-thermophilic microbial agent comprises the following components in parts by weight: 10-12 parts by weight of thermophilic methane bacteria, 8-10 parts by weight of hyper-thermophilic archaea, 2-3 parts by weight of Thermococcus, and 0.5-1 parts by weight of Pyrobaculum.

7. The in-situ steam thermal desorption process for remediating pesticide contaminated sites according to claim 1, wherein the mixing depth of hydrated lime in step S1 is 10-20 cm below the ground, and the mixing amount of hydrated lime is 15-20 kg/m² of soil.

8. The in-situ steam thermal desorption process for remediating pesticide contaminated sites according to claim 1, wherein in step S4, the tertiary injection point of tertiary steam injection is located at 70-75% of the depth of the remediation layer below the ground, and there are three steam outlet directions of the tertiary injection point, that is, due south, 60 degrees north by west and 60 degrees north by east.

9. The in-situ steam thermal desorption process for remediating pesticide contaminated sites according to claim 1, wherein step S1 further comprises ploughing the soil to remove gravel and dead leaves.

\* \* \* \* \*